Figure 1:
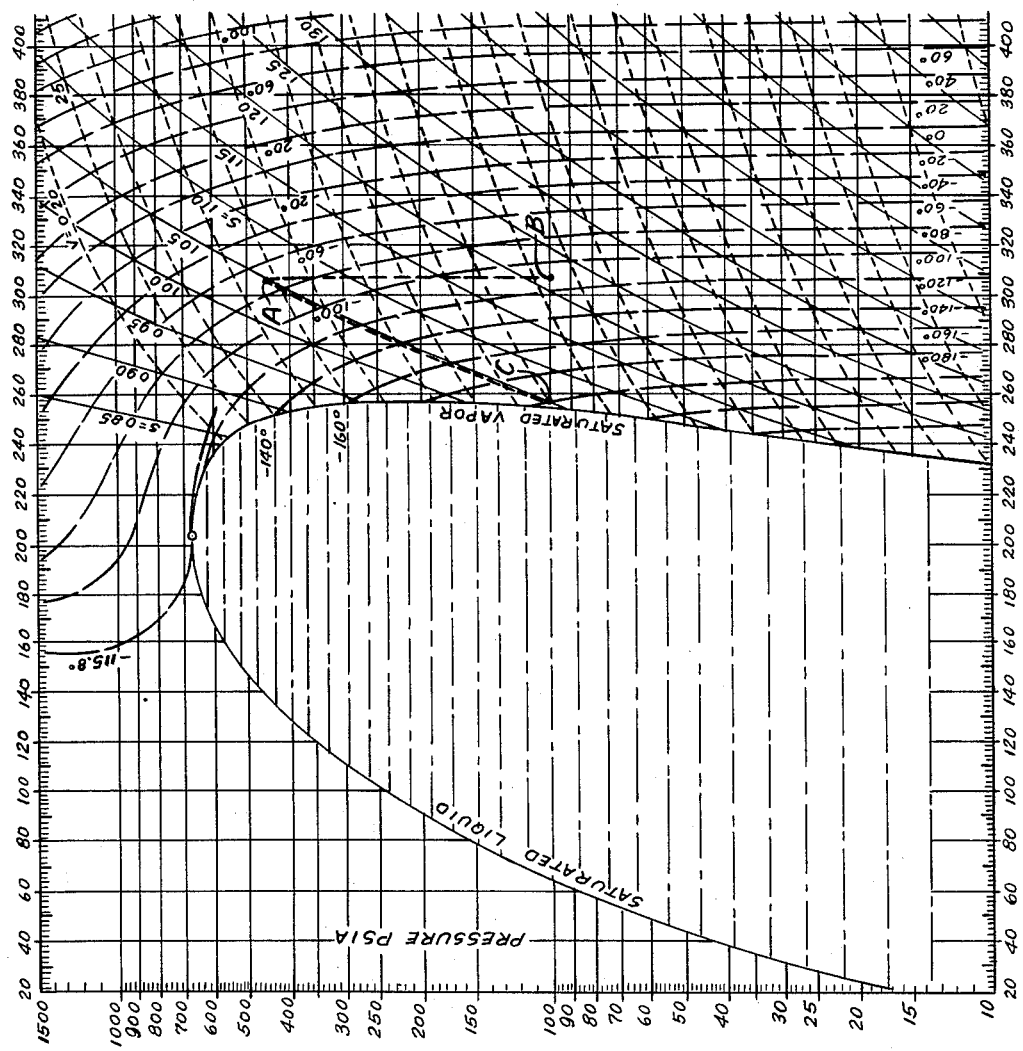

July 26, 1955 V. C. WILLIAMS 2,713,780
PROCESS FOR SEPARATION OF GASES
Filed Aug. 8, 1952 3 Sheets-Sheet 1

METHANE
PRESSURE-ENTHALPY
DIAGRAM
V=specific volume. cu.ft./lb.
S=entropy. Btu/lb.·°R.
All temperatures °F.

INVENTOR:
VIRGIL C. WILLIAMS,
BY Kingsland, Rogers & Ezell
ATTORNEYS

July 26, 1955   V. C. WILLIAMS   2,713,780
PROCESS FOR SEPARATION OF GASES
Filed Aug. 8, 1952   3 Sheets-Sheet 2
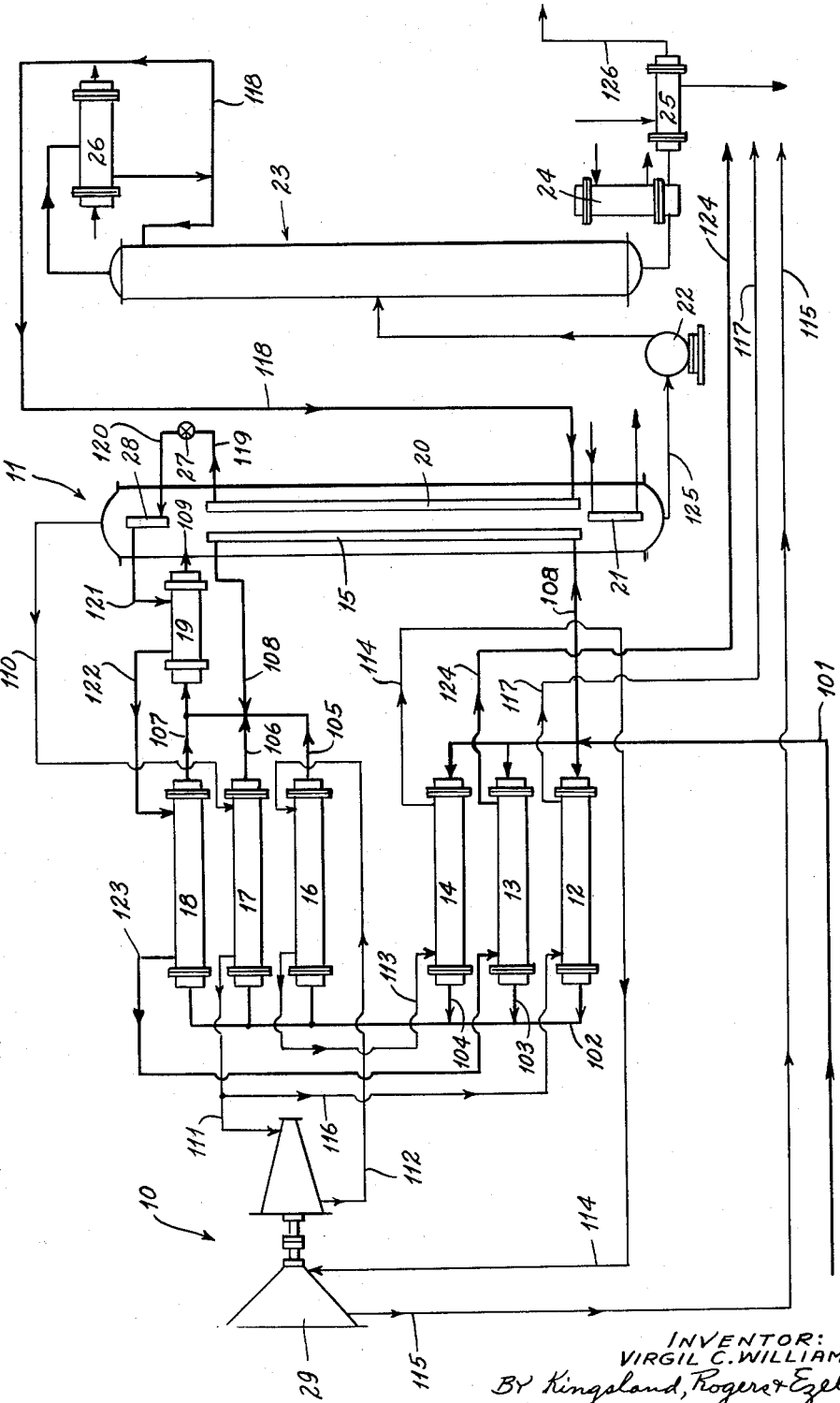
INVENTOR:
VIRGIL C. WILLIAMS,
BY Kingsland, Rogers & Ezell
ATTORNEYS

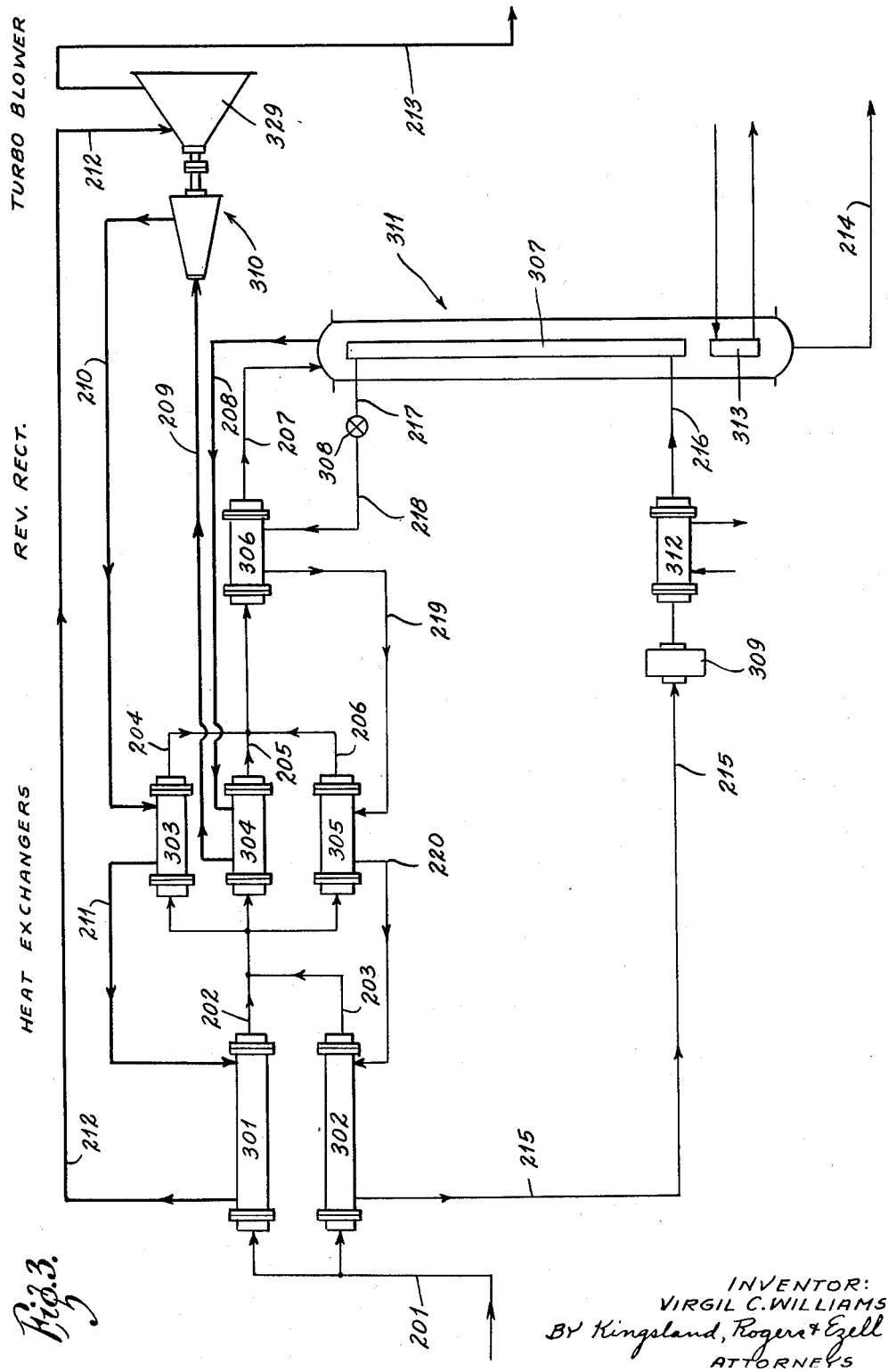

United States Patent Office 2,713,780
Patented July 26, 1955

2,713,780

PROCESS FOR SEPARATION OF GASES

Virgil C. Williams, Easton, Pa., assignor to Mississippi River Fuel Corporation, St. Louis, Mo., a corporation of Delaware Application August 8, 1952, Serial No. 303,276

10 Claims. (Cl. 62—175.5)

This invention relates to process and apparatus for separating fluid mixture such as natural gas into its components, and in particular, is concerned with a novel refrigeration stage used in conjunction with a reversible rectification applied in a novel manner to natural gas at very low temperatures.

The importance of natural gas has, in recent years, been more and more emphasized both for heating and industrial utilizations as well as for the recovery of the separate constituents of this gas. The normal constituents of natural gas are the hydrocarbons methane, ethane, propane, butanes and heavier molecular weight hydrocarbon substances along the miscellaneous unsaturated hydrocarbons and some non-hydrocarbon diluents. Methane is one of the major gases in natural gas, and of itself may be adequate in heating value to satisfy the quality demands of industrial and domestic fuel gas or may be used for chemical synthesis. The heavier hydrocarbon constituents have a more strategic value and greater importance in the chemical fields commercially when they can be separated economically from the natural gas. With the great expansion in the chemical industries that has taken place in the last two decades, such hydrocarbon materials as ethane, propane, butane, etc., have taken on a much greater value, as they may be used in the synthesis of an almost infinite number of organic products. Such uses of ethane, propane, butane and pentane include the whole field of chemical manufacture and liquefied petroleum gas for the last three named. The heavier saturated hydrocarbon materials, such as hexane, heptane, etc., may likewise be used in chemical manufacture or as a base for motor gasoline fuel products, etc.

It is to be understood that, where the term natural gas is used, this includes such other fluid mixtures as have substantial proportions of hydrocarbons or other organic constituents. These mixtures are characterized by the very wide temperature difference between the top of the column and the bottom of the column which is made possible because of the wide difference in boiling points between the overhead product and the other materials which are separated out as a bottoms product. This differentiates and makes possible the instant process as against the air rectification processes where $O_2$ and $N_2$ are so closely separated in their boiling points.

In the past the separation of natural gas into its components have been effected by such means as absorption with absorption oils or adsorbing the selected components on adsorptive solids from which they are stripped or desorbed in associated apparatus. Such processes in which varying temperatures and pressures may be utilized have been arranged for continuous operation in conventional practices known to the art, but have been objected to on the basis of incomplete separation, lack of efficiency and high cost involved in these procedures. It has likewise been suggested to separate the gas components in natural gas by refrigeration means, but this has been found to be inefficient and objectionable with respect to a commercial undertaking due to the difficulties heretofore attendant with the rectification and the proper and economical cooling of the natural gas to the low temperature required.

By reversible rectification is meant the theoretical arrangement by which a rectification column is operated so as to produce equal temperatures of vapor and liquid phases and a heat transfer medium, with heat flow in minimum quantities at each level of the column. In this invention, a low temperature reversible rectification process has been provided to effect an economical separation of gases with a minimum refrigeration requirement. The term "reversible rectification" as used in this invention means, practically speaking, a process in which heat abstraction or addition, by means of the heat exchange medium, is performed in minimum quantities under as low a temperature driving force as is consistent with economy.

In the practical application of this theoretical desideratum, a heat exchange medium is passed through the column in out-of-contact relationship with the liquid and vapor phases to supply whatever heat flow is necessary to cause the liquid and vapor phases to be in substantial equilibrium at every level, this usually involving the use of a heat exchange medium that is at only a slightly different temperature from the contents of the column, supplied at each level so as to provide a driving force to cause the separation of the desired liquid and vapor phases.

The reversible rectification process of this invention is to be contrasted to conventional processes in which a reboiler is provided at the bottom and a condenser at the top of a column. In such conventional processes, there is a large heat flow through a great temperature difference which involves an entropy increase and high thermodynamic irreversibilities and attendant inefficiencies. These take place wherever there are high temperature differences, mixing of hot and cold liquids or vapors, which are avoided in my reversible rectification process. Thus, wherever used herein, the term "reversible rectification" means the pactical process defined above with small temperature differences, as distinguished from theoretical reversible rectification or conventional rectification.

By means of this invention the separation of natural gas or other fluids into its components has been made possible with the production of a high purity resultant component gas without the need of any absorption oils or adsorptive solids. Further, a substantially absolute recovery has been effected with the only losses being due to negligible gas leakages which are almost positively prevented in the closed system of this invention. The separation of the natural gas into its components is made possible by a reversible rectification in which the temperature or pressure changes are effected as close to the ideal of thermodynamic reversibility as possible. Thus, temperature differences between the heat exchange medium and the material are kept as small as possible, consistent with the practical requirement that there be a small driving force to effect heat flow. In this process, where temperature and pressure changes are made in a gas, constant entropy may be maintained at an adiabatic condition for the overall process in such manner that the extremity low temperatures necessary for an efficient and economical rectification are made possible. The low temperatures required in this invention are effected by the use of a turbo-expander which receives gas at an elevated pressure and reduces this pressure to a lower level and thereby develops work and causes the gas to cool in an isentropic process. The use of this turbo-expander and the attendant decrease in energy of the gas when work is being done by the expander effectuates a very low temperature in the gas which is subsequently utilized in bringing down the temperature of the natural gas to that required for the efficient and economical operation of the reversible rectification stage.

Accordingly, it is a primary object of this invention to provide an apparatus and process for separating a fluid containing components of varying volatility into its components by a reversible rectification process in which the required low temperatures are effected by a means comprising a turbo-expansion of a fluid under pressure to refrigeratiing temperature under isentropic conditions.

It is a further object of this invention to separate methane in a high degree of purity from natural gas in a reversible rectification system in which the natural gas is cooled to a very low temperature by means of a refrigerating gas which is cooled in a turbo-expander.

It is another object of this invention to provide a process and apparatus for separating the components from natural gas in a reversible rectification stage which includes first cooling the natural gas to a low temperature by a refrigerating gas which has undergone an adiabatic reversible expansion and attendantly providing a fluid heating or vaporizing medium below the feed inlet and attendantly providing a fluid cooling or condensing medium above the feed inlet to the reversible rectification stage.

It is yet another object of this invention to provide an apparatus for separating the heavier hydrocarbons from methane in natural gas in a reversible rectification stage wherein the natural gas is preliminarily cooled to a very low degree by means comprising a turbo-expander which operates under isentropic conditions so as to reduce a gas which is to be used for the cooling process to a very low temperature, and subsequently utilizing the work performed by the turbo-expander in compressing one of the gases in the system.

Other objects of this invention will appear in the detailed disclosure taken in conjunction with the drawings illustrating several modifications of this invention. It is to be understood that these drawings which illustrate preferred embodiments of this invention are for purposes of description only and are not intended to be limiting in scope.

In the drawings:

Fig. 1 is a pressure enthalpy diagram for methane;
Fig. 2 is a flow diagram showing the apparatus and flow of material according to the method of this invention;
Fig. 3 is a modified flow diagram of this invention.

Reference will now be had to the drawings, and in particular, to Fig. 1 wherein a pressure-enthalpy diagram is shown for methane. The increased cooling which is made possible by the isentropic expansion of the cooling gas in the turbo-expander is readily appreciated when compared with the conventional valve expansion cooling process wherein a constant enthalpy adiabatic throttling is effected. As an example, the isentropic process AC will be compared with the isenthalpic Joule-Thomson expansion AB. With methane at minus 70° F. and 450 p. s. i. a. the gas may be isentropically expanded in the turbo-expander to 100 p. s. i. a. to the point C at which it has a temperature of minus 200° F. In the conventional valve expansion involving a constant enthalpy process the same gas expanded to the same pressure at point B will have a temperature of minus 115° F. The much greater temperature drop in the isentropic expansion AC to the same pressure as involved in the Joule-Thomson expansion makes possible the cooling of the refrigeration gas to the degree required for efficient and economical operation of the reversible rectification stage. The turbines in the turbo-expander used in this isentropic expansion produce external work, which may be subsequently utilized, and this work quantity is taken from the gas causing the severe drop in temperature of the gas as it traverses the turbines. No net or external work is produced in a valve expansion of the Joule-Thomson type so that less temperature reduction is experienced by the gas. The turbo-expander used in this invention may be of the conventional radial flow type described by Swearingen in "Transactions of American Institute of Chemical Engineers," volume 43, page 85, 1947, such as that manufactured by the Elliott Company of Jeannette, Pennsylvania.

As shown in Fig. 2, the turbo-expander, which is generally indicated at 10, is adapted to be used to cool a refrigerating gas which is then used to cool the natural gas fed to the reversible rectification column generally indicated at 11. This reversible rectification column may be filled with conventional packing, and instead of having a condenser at the very top and a reboiler at the very bottom, as is typical of conventional rectifiers, functions to distribute the cooling effect just as needed and exactly where required from the top to the natural gas inlet and similarly the heating effect from the bottom of the column to the natural gas inlet. It is of critical interest to note that the heating effect produced by a fluid, which concomitantly is thereby cooled, may be used by a change in an intensive factor as a much lower temperature cooling effect in some other portion of the system. This contributes strikingly to the feature of thermodynamic reversibility.

A flow diagram will now be described having reference to Fig. 2, but this is to be considered as an example only, since there are many alternative ways of passing the various streams through the units of the apparatus and achieving optimum thermal energy balances in obvious modifications, as will be apparent to those skilled in the art.

A natural gas stock, for example only, is furnished which analyzes as follows per hundred mols:

|  | Mols |
| --- | --- |
| Methane | 93.7 |
| Ethane | 4.80 |
| Propane | 1.04 |
| Isobutane | 0.22 |
| n-butane | 0.20 |
| Pentanes, plus | 0.04 |
| Total | 100.00 |

This natural gas enters the system as stream 101 at 70° F. and 450 p. s. i. a. and is subsequently split into four streams, 102, 103, 104 and 108, respectively, which pass through heat exchangers 12, 13, 14, and heat exchanger 15 in the reversible rectification column 11. Streams 102, 103 and 104 consist of 62.8 mols, 3.2 mols and 24.4 mols, respectively, totalling 90.4 mols, all of which is cooled to minus 35° F. In stream 108 the remainder of the stock, 9.6 mols, is cooled in passing through heat exchanger 15 in the column to minus 105° F. Streams 102, 103, and 104 are subsequently recombined and then split into three separate streams 105, 106 and 107 which pass through heat exchangers 16, 17 and 18, respectively, in which the streams are cooled to minus 105°. Streams 105, 106 and 107 consist of 17.9 mols, 70.5 mols and 2.0 mols, respectively, totalling 90.4 mols of stock. Streams 105, 106, 107 and 108 are combined into stream 109, which is cooled in the tubes of heat exchanger 19 to minus 110° F., at which condition about 16 mol percent of natural gas has been liquefied under the prevailing condition for approximately 450 p. s. i. a. It is to be understood, as will be described later, that the temperature and the degree of liquefaction of the stock fed to the columns may range from the dew point to complete liquefaction by appropriately rearranging the heat balances in the system.

The total natural gas stream 109 is then passed into the reversible rectifier column 11 and the liquid portion flows downwardly over surface contact means, such as packing (not shown), in contact with heat exchange surfaces 15 and 20, which vaporize the methane from the liquid by the reversible rectification stripping process previously described. A small steam heated exchanger 21 is required at the bottom of the column to furnish some heat because the bottoms product from the natural gas has a vaporization temperature at 450 p. s. i. a. of plus 88° F., which is above the temperatures available from the streams of gas so introduced into the column.

The bottoms product comprising 4.20 mols of ethane and heavier components is drawn off from the rectifying column 11 through line 125 and is pumped through pump 22 to a de-ethanizer column 23 where the stream is conventionally rectified to ethane tops comprising 2.70 mols and a propane plus heavier bottoms of 1.50 mols. This bottoms products is then, after a partial recycling through the reboiler 24 at the bottom of the column, led through line 126 through the aftercooler 25 to ultimate product recovery. The de-ethanizer column operates at a pressure of 560 p. s. i. a. and has a condenser 26 provided with a cooling fluid at the top for typical partial refluxing of the ethane stream.

The ethane stream 118 comprises substantially 100% ethane and is introduced to the heat exchanger 20 inside the reversible rectifier 11 to furnish additional heat for methane stripping from the natural gas on the exterior surface of the exchanger. The ethane leaves the exchanger as stream 119 at minus 100° F. and about 560 p. s. i. a. This stream is dropped in pressure across the valve 27 and flashes to a temperature of minus 120° F. at 19 p. s. i. a. in an adiabatic expansion. The expanded ethane stream 120 at this temperature enters heat exchanger 28 in the rectification column which supplies a cooling effect inside the rectifier to reflux back the heavier constituents from the essentially pure methane stream leaving the rectifier as stream 110 at minus 112° F. and 450 p. s. i. a. The heat supplied by the ethane to heat exchanger 28 is in the form of latent heat so that there is no temperature reduction in the stream.

The evaporating ethane stream then passes from heat exchanger 28 to stream 121 and is introduced countercurrently to the feed mixture in heat exchanger 19 leaving in stream 122 at minus 120° F. and then passes countercurrently through heat exchanger 18 leaving in stream 123 at minus 50° F. and finally through heat exchanger 13 from which it leaves as product ethane stream 124 at plus 60° F. 19 p. s. i. a.

Now the path of the product methane leaving the reversible rectification column 11 will be considered. The product methane stream 110 consists of 96 mols of methane of 98% purity at minus 112° F. and 450 p. s. i. a., which is introduced countercurrently to the natural gas feed in heat exchanger 17, in which process it is warmed to minus 50° F. After leaving the heat exchanger, this stream is split into two streams, 111 and 116, the latter of which includes 68 mols and is passed through heat exchanger 12 in which it is warmed to plus 60° F. in countercurrently cooling the natural gas feed. After passing through this heat exchanger, the methane is led through stream 117 at 450 p. s. i. a. to product use. The other stream, 111, consists of 28 mols and enters the turbo-expander at minus 50° F. and 450 p. s. i. a. wherein it is expanded to minus 120° F. and 200 p. s. i. a. into stream 112 which is then led to heat exchanger 16 in which it is warmed to minus 50° F. in stream 113 flowing countercurrently to the feed. Stream 113 traverses heat exchanger 14 and leaves as stream 114 at plus 60° F. and 200 p. s. i. a. This stream is introduced to the blower 29 of the turbo-expander-blower combination in which the work performed by the expanding gas in the turbo-expander section is used for compression as previously described. This blower, which is water-cooled ordinarily, increases the pressure of stream 114 to 300 p. s. i. a. from whence it leaves as stream 115 at 60° F. to ultimate product use.

The overall accomplishment of this process has been to separate the natural gas into its constituents in a very efficient and economical separation procedure. Methane has been recovered to the extent of 96 mols of 98% purity, whereas 2.70 mols of ethane have been reclaimed of substantially 100% purity. The bottoms product comprising 1.50 mols of propane and heavier molecular weight products can be separated by conventional procedures where this economical recovery is indicated. Other arrangements of the thermal balancing of the heat exchangers and rectifiers may be used to accomplish the same end purpose as will be readily recognized in the technology once the concept of this invention has been comprehended. It is further to be realized that the reversible rectifier may include externally and/or internally finned tubes over and across which surfaces rectification and heat transfer take place.

An alternative modification to the arrangement shown in Fig. 2 is shown in the flow diagram in Fig. 3. In this embodiment of the invention, natural gas of the same analysis described above in connection with Fig. 2 is introduced to the process through stream 201 at 70° F. and 450 p. s. i. a. This stream is divided into two streams, 202 and 203, which include 77 mols and 23 mols, respectively, and are cooled to minus 60° F. in heat exchangers 301 and 302, respectively. These streams are then combined and divided into three streams 204, 205 and 206, which include 46 mols, 43.5 mols and 10.5 mols, respectively, which are cooled to minus 120° F. in heat exchangers 303, 304 and 305, respectively. These streams are then combined as stream 207 which consists of the total 100 mols of feed gas and is cooled in heat exchanger 306 to minus 130.7° F. At this temperature and the pressure of 450 p. s. i. a., the feed gas is completely liquefied.

The liquefied natural gas is then reversibly rectified and stripped in the rectification column 311 so as to produce essentially pure methane of 99.7% purity which effluxes from the top of the column as stream 208 at minus 130.7° F. and which consists of 94.1 mols. This stream 208 furnishes the cooling effect in heat exchanger 304, where it is warmed to minus 75° F. as stream 209, which is then expanded in the turbo-expander 310 from 450 p. s. i. a. to 150 p. s. i. a. and a temperature of minus 150° F. in stream 210. The latter is used as a refrigerant in heat exchanger 303 and is warmed to minus 75° F. in stream 211 which then passes through heat exchanger 301 and is further warmed to plus 60° F. in stream 212. This latter stream 212 is then compressed to 230 p. s. i. a. by the blower 329 which is driven by the turbo-expander to deliver the stream 213 at 60° F. for ultimate product use. In this example of the reversible rectification, little refrigeration effect is required above the feed inlet for a condition of completely liquefied feed so the cooling heat exchanger is minimized and is not included, although theoretically it is of some small benefit in increasing purities.

The heat required in the reversible rectifier 311, below the feed inlet, is supplied in heat exchanger 307 by condensing 25.6 mols of ethylene at 45 p. s. i. a. This ethylene enters as gas stream 216 at 70° F. and leaves the heat exchanger as a liquid stream 217 at minus 115° F. from which it is expanded through valve 308 in an adiabatic expansion to 22 p. s. i. a. and minus 140° F. to stream 218. This stream is evaporated in the shell of heat exchanger 306 to cool the natural gas feed stock, and the resultant ethylene vapor stream 219 is then utilized in the heat exchanger 305 in which it is warmed to minus 75° F. in stream 220. This latter stream is then passed through heat exchanger 302 in which it is heated to plus 60° F. and then recycled through stream 215 to the compressor 309 in which the ethylene stream is compressed to 45 p. s. i. a. and is subsequently cooled by the water-cooled heat exchanger 312 to 70° F. delivering again stream 216 in a closed cycle.

The bottom of the rectification column 311 may be provided with a heat exchanger 313 so as to provide a small amount of heat which is furnished by steam in the heat exchanger, although by suitable heat balancing means this could be provided by the ethylene stream.

The bottoms product is drawn from the bottom of the column in stream 214 and includes 5.9 mols of ethane and heavier molecular weight products which analyze as follows:

| | Mol per cent |
|---|---|
| Ethane | 75 |
| Propane | 17 |
| Butanes, plus | 8 |
| Total | 100 |

This stream 214 is delivered at plus 78° F. and 450 p. s. i. a. to a conventional rectifying installation which may be similar to the de-ethanizer 23 described in connection with Fig. 2 for separation of the components.

It is readily seen that the full process described in Fig. 3 differs from that in Fig. 2 in that an auxiliary refrigerating stream of ethylene is cycled within the plant. Also, the feed is introduced to the column completely liquefied so that in practice no cooling is required in the column above the feed inlet. Somewhat better recoveries are obtained for this process as compared to Fig. 2, but at the expense of additional work of compression for the ethylene. Ethane is recovered to the extent of 94% compared to 50%, whereas the propanes and heaviers may be obtained in almost 100% recovery by either process.

It is apparent that there has been provided by this invention a novel and advantageous means for separating constituents of varying degrees of volatility from fluid mixtures, and specifically, methane and other components from natural gas. This is effected by novel reversible rectification and heat exchange processes in which the necessary low temperatures are obtained by an isentropic expansion of one of the rectified gases and efficient heat exchange in the units of the apparatus. The low temperature obtained by the isentropic expansion in the turbo-expander makes possible very low temperatures without the necessity of extremely high compressions as required by the conventional isenthalpic valve processes. The efficient reversible rectification and heat transfer make practical an economical separation system without the necessity of using any complicated compressors. Two practical modifications of the process have been shown in connection with this invention, and it is obvious that other flow systems may be used so as to modify the thermal balances and division of materials.

Such modification as will be apparent to those skilled in the art are intended to be included in the scope of this invention, which is to be limited only by the breadth of the appended claims.

What is claimed is:

1. A process for reducing the cooling and refrigeration requirements in the separation under elevated pressure and reduced temperature of a fluid mixture including a substantial proportion of hydrocarbons having different boiling points into an overhead product and a bottoms product in which at least one of said products comprises a major proportion of hydrocarbons, in a vertical column type system having a condensing section with a fluid inlet opening into the column beneath the bottom of said section and a stripping section extending downwardly from adjacent the inlet to the lower part of the column, which comprises the steps of: cooling the feed fluid mixture at an elevated pressure from an ambient temperature to a reduced temperature between its dew point and complete condensation wherein said fluid is at least partially condensed, delivering the feed mixture into the column by means of the inlet; supplying heat sufficient to vaporize substantially all of the lower boiling point components, at least part of said heat being supplied by introducing into the bottom portion of the stripping section a fluid heat exchange medium in indirect heat exchange relation with, and at a temperature slightly above, the temperature of the material in the bottom of the column at its point of introduction, said heat exchange medium consisting of at least a part of said feed fluid prior to its deliverance to the column, providing thereby a rising vapor stream of the lower boiling components and a descending liquid stream of the higher boiling point components; causing the heat exchange medium to rise within the column and cooling the heat exchange medium by heat exchange with the vapor and liquid components within the column under conditions such that at any section in the column where said heat exchange medium is present, said heat exchange medium, vapor and liquid components are all in substantial temperature equilibrium with one another, and withdrawing said heat exchange medium from the column adjacent the inlet at approximately the reduced temperature of the incoming mixture of fluids.

2. A process for reducing the cooling and refrigeration requirements in the separation under elevated pressure and reduced temperature of a feed fluid mixture including a substantial proportion of hydrocarbons having different boiling points into an overhead product and a bottoms product in which at least one of said products comprises a major proportion of hydrocarbons, in a vertical column type system having a fluid inlet opening into the column and a stripping section extending downwardly from adjacent the inlet to the lower part of the column, which comprises the steps of: providing a feed fluid mixture to be separated; dividing a first portion from the feed mixture, cooling the rest of the feed fluid mixture at an elevated pressure from an ambient temperature to a reduced temperature between its dew point and complete condensation wherein said fluid is at least partially condensed, delivering the feed mixture at elevated pressure through the inlet into the column; supplying heat sufficient to vaporize substantially all of the lower boiling point components, at least part of said heat being supplied by introducing into the bottom portion of the stripping section a fluid heat exchange medium in indirect heat exchange relation with, and at a temperature slightly above, the temperature of the material in the bottom of the column at its point of introduction, said heat exchange medium consisting of the first portion of said feed fluid prior to its deliverance to the column, providing thereby a rising vapor stream of the lower boiling components and a descending liquid stream of the higher boiling point components; causing the heat exchange medium to rise within the column and cooling the heat exchange medium by heat exchange with the vapor and liquid components within the column under conditions such that at any section in the column where said heat exchange medium is present, said heat exchange medium, vapor and liquid components are all in substantial temperature equilibrium with one another, but the heat exchange medium has slightly higher temperatures so as to provide a driving force for vaporizing the liquid, and withdrawing said heat exchange medium from its indirect heat exchanging function in the column, adjacent the inlet at approximately the reduced temperature of the incoming mixture of fluids, returning the first portion of the feed mixture to the otherwise cooled remainder of that mixture, and introducing the whole of the feed mixture through the inlet as aforesaid.

3. A process for reducing the cooling and refrigeration requirements in the separation under elevated pressure and reduced temperature of a feed fluid mixture including a substantial proportion of hydrocarbons having different boiling points into an overhead product and a bottoms product in which at least one of said products comprises a major proportion of hydrocarbons, in a vertical column type system having a fluid inlet opening into the column and a stripping section extending downwardly from adjacent the inlet to the lower part of the column, which comprises the steps of: providing a feed fluid mixture to be separated; dividing a first portion from the feed mixture, cooling the rest of the feed fluid mixture at an elevated pressure from an ambient temperature to a reduced temperature between its dew point and complete condensation wherein said fluid is at least partially condensed, delivering the feed mixture at elevated pressure through the inlet into the column, supplying heat sufficient to vaporize substantially all of the lower boiling point components, at least part of said heat being supplied by introducing into the bottom portion of the stripping section a fluid heat exchange medium in indirect heat exchange relation with, and at a temperature slightly above, the temperature of the material in the bottom of the column at its point of introduction, said heat exchange medium consisting of the first portion of said feed fluid prior to its deliverance to the column, providing thereby a rising vapor stream of the lower boiling components and a descending liquid stream of the higher boiling point components; causing the heat exchange medium to rise within the column and cooling the heat exchange medium by heat exchange with the vapor and liquid components within the column under conditions such that at any section in the column where said heat exchange medium is present, said heat exchange medium, vapor and liquid components are all in substantial temperature equilibrium with one another, but the heat exchange medium has slightly higher temperatures so as to provide a driving force for vaporizing the liquid, and withdrawing said heat exchange medium from its indirect heat exchanging function in the column, adjacent the inlet at approximately the reduced temperature of the incoming mixture of fluids, returning the first portion of the feed mixture to the otherwise cooled remainder of that mixture, and introducing the whole of the feed mixture through the inlet as aforesaid, said feed fluid mixture in said cooling stage being divided into a plurality of streams passing through parallel heat exchange stages in which the streams of fluid mixture after passing through each parallel stage are recombined to effect efficient heat transfer utilization and standard temperature control.

4. A process for reducing the cooling and refrigeration requirements in the separation under elevated pressure and reduced temperature of a feed fluid mixture including a substantial proportion of hydrocarbons having different boiling points into an overhead product and a bottoms product in which at least one of said products comprises a major proportion of hydrocarbons, in a vertical column type system having a fluid inlet opening into the column and a stripping section extending downwardly from adjacent the inlet to the lower part of the column, which comprises the steps of: providing a feed fluid mixture to be separated; dividing a first portion from the feed mixture, cooling the rest of the feed fluid mixture at an elevated pressure from an ambient temperature to a reduced temperature between its dew point and complete condensation wherein said fluid is at least partially condensed, delivering the feed mixture at elevated pressure through the inlet into the column; supplying heat sufficient to vaporize substantially all of the lower boiling point components, at least part of said heat being supplied by introducing into the bottom portion of the stripping section a fluid heat exchange medium in indirect heat exchange relation with, and at a temperature slightly above, the temperature of the material in the bottom of the column at its point of introduction, said heat exchange medium consisting of the first portion of said feed fluid prior to its deliverance to the column, providing thereby a rising vapor stream of the lower boiling components and a descending liquid stream of the higher boiling point components; causing the heat exchange medium to rise within the column and cooling the heat exchange medium by heat exchange with the vapor and liquid components within the column under conditions such that at any section in the column where said heat exchange medium is present, said heat exchange medium, vapor and liquid components are all in substantial temperature equilibrium with one another, but the heat exchange medium has slightly higher temperatures so as to provide a driving force for vaporizing the liquid, and withdrawing said heat exchange medium from its indirect heat exchange function in the column, adjacent the inlet at approximately the reduced temperature of the incoming mixture of fluids, returning the first portion of the feed mixture to the otherwise cooled remainder of that mixture, and introducing the whole of the feed mixture through the inlet as aforesaid, said heat supplied to vaporize said lower boiling point components being further furnished in part by indirect heat exchange with a second fluid stream which is introduced beneath said feed inlet and passed upwardly within the column and is taken out of the column adjacent said feed inlet.

5. A process for reducing the cooling and refrigeration requirements in the separation under elevated pressure and reduced temperature of a feed fluid mixture including a substantial proportion of hydrocarbons having different boiling points into an overhead product and a bottoms product in which at least one of said products comprises a major proportion of hydrocarbons, in a vertical column type system having a fluid inlet opening into the column and a stripping section extending downwardly from adjacent the inlet to the lower part of the column, which comprises the steps of: providing a feed fluid mixture to be separated; dividing a first portion from the feed mixture, cooling the rest of the feed fluid mixture at an elevated pressure from an ambient temperature to a reduced temperature between its dew point and complete condensation wherein said fluid is at least partially condensed, delivering the feed mixture at elevated pressure through the inlet into the column, supplying heat sufficient to vaporize substantially all of the lower boiling point components, at least part of said heat being supplied by introducing into the bottom portion of the stripping section a fluid heat exchange medium in indirect heat exchange relation with, and at a temperature slightly above, the temperature of the material in the bottom of the column at its point of introduction, said heat exchange medium consisting of the first portion of said feed fluid prior to its deliverance to the column, providing thereby a rising vapor stream of the lower boiling components and a descending liquid stream of the higher boiling point components; causing the heat exchange medium to rise within the column and cooling the heat exchange medium by heat exchange with the vapor and liquid components within the column under conditions such that at any section in the column where said heat exchange medium is present, said heat exchange medium, vapor and liquid components are all in substantial temperature equilibrium with one another, but the heat exchange medium has slightly higher temperatures so as to provide a driving force for vaporizing the liquid, and withdrawing said heat exchange medium from its indirect heat exchanging function in the column, adjacent the inlet at approximately the reduced temperature of the incoming mixture of fluids, returning the first portion of the feed mixture to the otherwise cooled remainder of that mixture, and introducing the whole of the feed mixture through the inlet as aforesaid, said heat supplied to vaporize said lower boiling point components being further furnished in part by indirect heat exchange with a fluid stream which is obtained as an overhead product of a later rectification of the liquid higher boiling components drawn off from the bottom of said column, said fluid stream being introduced in the bottom of said column and being taken out adjacent the feed inlet.

6. A process for reducing the cooling and refrigeration requirements in the separation under elevated pressure and reduced temperature of a fluid mixture including a substantial proportion of hydrocarbons having different boiling points into an overhead product and a bottoms product in which at least one of said products comprises a major proportion of hydrocarbons in a vertical column type system having a condensing section with a fluid inlet opening into the column beneath the bottom of said section and a stripping section extending downwardly from adjacent the inlet to the lower part of the column, which comprises the steps of: cooling the feed fluid mixture at an elevated pressure from an ambient temperature to a reduced temperature between its dew point and complete condensation wherein said fluid is at least partially condensed, delivering the feed mixture into the column by means of the inlet; supplying heat sufficient to vaporize substantially all of the lower boiling point components, at least part of said heat being supplied by introducing into the bottom portion of the stripping section a fluid heat exchange medium in indirect heat exchange relation with, and at a temperature slightly above, the temperature of the material in the bottom of the column at its point of introduction, said heat exchange medium consisting of at least a part of said feed fluid prior to its deliverance to the column, providing thereby a rising vapor stream of the lower boiling components and a descending liquid stream of the higher boiling point components; causing the heat exchange medium to rise within the column and cooling the heat exchange medium by heat exchange with the vapor and liquid components within the column under conditions such that at any section in the column where said heat exchange medium is present, said heat exchange medium, vapor and liquid components are all in substantial temperature equilibrium with one another, and withdrawing said heat exchange medium from the column adjacent the inlet at approximately the reduced temperature of the incoming mixture of fluids, said heat supplied to vaporize said lower boiling point components being further furnished in part by indirect heat exchange with a fluid stream which is obtained as an overhead product of a later rectification of the liquid higher boiling components drawn off from the bottom of said column, said fluid stream being introduced in the bottom of said column and being taken out adjacent the feed inlet, expanding said fluid stream to a reduced temperature and pressure to cool the same, said cooled fluid stream then being introduced into the condensing section of said column above the inlet to abstract heat from the material in the column above said inlet.

7. A process for reducing the cooling and refrigeration requirements in the separation under elevated pressure and reduced temperature of a feed fluid mixture including a substantial proportion of hydrocarbons having different boiling points into an overhead product and a bottoms product in which at least one of said products comprises a major proportion of hydrocarbons, in a vertical column type system having a fluid inlet opening into the column and a stripping section extending downwardly from adjacent the inlet to the lower part of the column, which comprises the steps of: providing a feed fluid mixture to be separated; dividing a first portion from the feed mixture, cooling the rest of the feed fluid mixture at an elevated pressure from an ambient temperature to a reduced temperature between its dew point and complete condensation wherein said fluid is at least partially condensed, delivering the feed mixture at elevated pressure through the inlet into the column; supplying heat sufficient to vaporize substantially all of the lower boiling point components, at least part of said heat being supplied by introducing into the bottom portion of the stripping section a fluid heat exchange medium in indirect heat exchange relation with, and at a temperature slightly above, the temperature of the material in the bottom of the column at its point of introduction, said heat exchange medium consisting of the first portion of said feed fluid prior to its deliverance to the column, providing thereby a rising vapor stream of the lower boiling components and a descending liquid stream of the higher boiling point components; causing the heat exchange medium to rise within the column and cooling the heat exchange medium by heat exchange with the vapor and liquid components within the column under conditions such that at any section in the column where said heat exchange medium is present, said heat exchange medium, vapor and liquid components are all in substantial temperature equilibrium with one another, but the heat exchange medium has slightly higher temperatures so as to provide a driving force for vaporizing the liquid, said cooling of the heat exchange medium being under conditions whereby it imparts sensible heat to the column as it first enters the column and travels upwardly and then intermediate its introduction and withdrawal points imparts both sensible and latent heat to the material in the column under conditions such that said heat exchange medium is partially condensed when removed, and withdrawing said heat exchange medium from its indirect heat exchanging function in the column, adjacent the inlet at approximately the reduced temperature of the incoming mixture of fluids, returning the first portion of the feed mixture to the otherwise cooled remainder of that mixture, and introducing the whole of the feed mixture through the inlet as aforesaid.

8. A process for reducing the cooling and refrigeration requirements in the separation under elevated pressure and reduced temperature of a feed fluid mixture including a substantial proportion of hydrocarbons having different boiling points into an overhead product and a bottoms product in which at least one of said products comprises a major proportion of hydrocarbons, in a vertical column type system having a fluid inlet opening into the column and a stripping section extending downwardly from adjacent the inlet to the lower part of the column, which comprises the steps of: providing a feed fluid mixture to be separated; dividing a first portion from the feed mixture, cooling the rest of the feed fluid mixture at an elevated pressure from an ambient temperature to a reduced temperature between its dew point and complete condensation wherein said fluid is at least partially condensed, delivering the feed mixture at elevated pressure through the inlet into the column; supplying heat sufficient to vaporize substantially all of the lower boiling point components, at least part of said heat being supplied by introducing into the bottom portion of the stripping section a fluid heat exchange medium in indirect heat exchange relation with, and at a temperature slightly above, the temperature of the material in the bottom of the column at its point of introduction, said heat exchange medium consisting of the first portion of said feed fluid prior to its deliverance to the column, providing thereby a rising vapor stream of the lower boiling components and a descending liquid stream of the higher boiling point components; causing the heat exchange medium to rise within the column and cooling the heat exchange medium by heat exchange with the vapor and liquid components within the column under conditions such that at any section in the column where said heat exchange medium is present, said heat exchange medium, vapor and liquid components are all in substantial temperature equilibrium with one another, but the heat exchange medium has slightly higher temperatures so as to provide a driving force for vaporizing the liquid, and withdrawing said heat exchange medium from its indirect heat exchanging function in the column, adjacent the inlet at approximately the reduced temperature of the incoming mixture of fluids, returning the first portion of the feed mixture to the otherwise cooled remainder of that mixture, and introducing the whole of the feed mixture through the inlet as aforesaid, said rising vapor stream of the lower boiling point components being withdrawn from the top of the column and being subsequently expanded to a reduced pressure and temperature and utilizing said expanded stream to abstract heat from the feed fluid before it enters the column.

9. A process for reducing the cooling and refrigeration requirements in the separation under elevated pressure and reduced temperature of a feed fluid mixture including a substantial proportion of hydrocarbons having different boiling points into an overhead product and a bottoms product in which at least one of said products comprises a major proportion of hydrocarbons, in a vertical column type system having a fluid inlet opening into the column and a stripping section extending downwardly from adjacent the inlet to the lower part of the column, which comprises the steps of: providing a feed fluid mixture to be separated; dividing a first portion from the feed mixture, cooling the rest of the feed fluid mixture at an elevated pressure from an ambient temperature to a reduced temperature between its dew point and complete condensation wherein said fluid is at least partially condensed, delivering the feed mixture at elevated pressure through the inlet into the column; supplying heat sufficient to vaporize substantially all of the lower boiling point components, at least part of said heat being supplied by introducing into the bottom portion of the stripping section a fluid heat exchange medium in indirect heat exchange relation with, and at a temperature slightly above, the temperature of the material in the bottom of the column at its point of introduction, said heat exchange medium consisting of the first portion of said feed fluid prior to its deliverance to the column, providing a rising vapor stream of the lower boiling components and a descending liquid stream of the higher boiling point components; causing the heat exchange medium to rise within the column and cooling the heat exchange medium by heat exchange with the vapor and liquid components within the column under conditions such that at any section in the column where said heat exchange medium is present, said heat exchange medium, vapor and liquid components are all in substantial temperature equilibrium with one another, but the heat exchange medium has slightly higher temperatures so as to provide a driving force for vaporizing the liquid, and withdrawing said heat exchange medium from its indirect heat exchanging function in the column, adjacent the inlet at approximately the reduced temperature of the incoming mixture of fluids, returning the first portion of the feed mixture to the otherwise cooled remainder of that mixture, and introducing the whole of the feed mixture through the inlet as aforesaid, said rising vapor stream of the lower boiling point components being withdrawn from the top of the column and being subsequently expanded to a reduced pressure and temperature under insentropic conditions with the performance of external work and utilizing said expanded stream to abstract heat from the feed fluid before it enters the column, said expanded stream being subsequently compressed by the work expended in said expansion step.

10. A process for reducing the cooling and refrigeration requirements in the separation under elevated pressure and reduced temperature of a feed fluid mixture including a substantial proportion of hydrocarbons having different boiling points into an overhead product and a bottoms product in which at least one of said products comprises a major proportion of hydrocarbons, in a vertical column type system having a fluid inlet opening into the column and a stripping section extending downwardly from adjacent the inlet to the lower part of the column, which comprises the steps of: providing a feed fluid mixture to be separated; dividing a first portion from the feed mixture, cooling the rest of the feed fluid mixture at an elevated pressure from an ambient temperature to a reduced temperature between its dew point and complete condensation wherein said fluid is at least partially condensed, delivering the feed mixture at elevated pressure through the inlet into the column; supplying heat sufficient to vaporize substantially all of the lower boiling point components, at least part of said heat being supplied by introducing into the bottom portion of the stripping section a fluid heat exchange medium in indirect heat exchange relation with, and at a temperature slightly above, the temperature of the material in the bottom of the column at its point of introduction, said heat exchange medium consisting of the first portion of said feed fluid prior to its deliverance to the column, providing thereby a rising vapor stream of the lower boiling components and a descending liquid stream of the higher boiling point components; causing the heat exchange medium to rise within the column and cooling the heat exchange medium by heat exchange with the vapor and liquid componets within the column under conditions such that at any section in the column where said heat exchange medium is present, said heat exchange medium, vapor and liquid components are all in substantial temperature equilibrium with one another, but the heat exchange medium has slightly higher temperatures so as to provide a driving force for vaporizing the liquid, and withdrawing said heat exchange medium from its indirect heat exchanging function in the column, adjacent the inlet at approximately the reduced temperature of the incoming mixture of fluids, returning the first portion of the feed mixture to the otherwise cooled remainder of that mixture, and introducing the whole of the feed mixture through the inlet as aforesaid, said feed fluid mixture in said cooling stage being divided into a plurality of streams passing through parallel heat exchange stages in which the streams of fluid mixture after passing through each parallel stage are recombined to effect efficient heat transfer utilization and standard temperature control, the refrigeration required for said cooling stage being supplied at least in part by utilizing the refrigerated upwardly rising vapor stream which is withdrawn from the column at a lower temperature than the temperature of the feed fluid entering the column, said vapor stream after being withdrawn from the column being further cooled by expanding it to a reduced pressure.

References Cited in the file of this patent

UNITED STATES PATENTS

| | | |
|---|---|---|
| 1,163,423 | Lilienfeld | Dec. 7, 1915 |
| 1,607,322 | Van Nuys et al. | Nov. 16, 1926 |
| 1,678,485 | Schlitt et al. | July 24, 1928 |
| 2,116,191 | De Baufre | May 3, 1938 |
| 2,134,702 | Brewster | Nov. 1, 1938 |
| 2,146,197 | Twomey | Feb. 7, 1939 |
| 2,417,279 | Van Nuys | Mar. 11, 1947 |
| 2,458,894 | Collins | Jan. 11, 1949 |
| 2,526,996 | Crawford | Oct. 24, 1950 |
| 2,541,409 | Cornelius | Feb. 13, 1951 |
| 2,583,090 | Cost | Jan. 22, 1952 |
| 2,627,731 | Benedict | Feb. 10, 1953 |
| 2,658,360 | Miller | Nov. 10, 1953 |
| 2,677,945 | Miller | May 11, 1954 |
| 2,690,060 | Legatski | Sept. 28, 1954 |